United States Patent Office 3,360,887
Patented Jan. 2, 1968

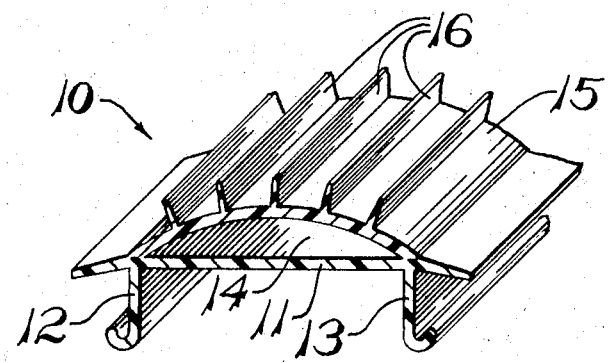

3,360,887
EXTRUDED SEALING MEMBER
Sheldon A. Parks and Howard J. Naeser, Marietta, Ohio, assignors to The B. F. Goodrich Company, New York, N.Y., a corporation of New York
Original application Feb. 23, 1965, Ser. No. 434,385. Divided and this application June 30, 1966, Ser. No. 561,983
5 Claims. (Cl. 49—490)

This application is a division of our copending application Ser. No. 434,385, filed Feb. 23, 1965.

This invention relates to a member for effecting a seal between two relatively movable members one of which provides a closure for an opening in the other. More particularly, the invention relates to an elongated extrusion adapted to provide a seal between a wall member, adjacent an opening therein, and a closure member for that opening.

It is frequently necessary to provide a thermal and/or air barrier between a closure member for an opening and the portion of the cabinet or frame member adjacent the periphery of that opening. For example, it is now common to provide doors to buildings with threshold strips and edge seals to provide a barrier to the passage of air, moisture, and heat. Seals of this type are generally attached to one of the two relatively movable members, i.e., to the door or frame member, with a flexible portion positioned for engagement with the other member.

The aforementioned sealing members for closures are now generally made of elastomeric material, such as synthetic or natural rubber or synthetic plastics, which are readily formed by extruding to provide a deformable portion and an integral attaching portion. Conventionally, these two portions may vary in thicknesses to provide different strength and flexibility but are formed of material of uniform composition throughout. Hence, the attaching portion is so flexible and/or so subject to tear that it is necessary to employ mounting strips of metal or other rigid material for securing the sealing members in place. This is not only costly but also results in a number of other undesirable characteristics.

The principal object of this invention is, therefore, to provide an improved sealing member of the type described comprising an elongated one-piece extrusion having integral longitudinally extending portions of materials of different compositions with the portion adapted to be attached to one of two relatively movable members formed of a material which is stiffer than the composition employed in the portion extending from the attaching portion for engagement by the other of the two relatively movable members, whereby the sealing member can be directly attached without the need of a separate fastening strip, clips or panels.

A further object of the invention is to provide a one-piece elongated extrusion formed entirely of synthetic plastic capable of having its stiffness reduced by the addition thereto of a plasticizer with the extrusion comprising a deformable portion adapted for sealing cooperation between two members to one of which the extrusion is attachable by a stiffer portion thereof with the said deforable portion containing a greater proportion of plasticizer than that in the portion of greater stiffness.

An additional object of the invention is to provide a one-piece elongated extrusion capable of providing a seal between a wall member adjacent an opening and a closure member for that opening characterized by the extrusion comprising an elongated strip-like attaching portion formed of rigid plastic material integrally with a deformable hollow sealing portion that is formed of flexible plastic material, the said attaching portion being adapted to be directly secured to one of the two members between which the seal is to be provided to thereby dispose the said deformable portion in position for engagement by the other of said members.

A still further object of the invention is to provide a sealing strip comprising a unitary extrusion of plastic material including an elongated strip-like base portion from one face of which extends integral attaching means while from the other face extends an elongated integral hollow deformable body, the said hollow body having flexible walls while the said base portion and attaching means are formed of rigid material.

Additional objects and advantages of the invention will be apparent from the following description of the presently preferred embodiment described with reference to the accompanying drawing, forming a part of this application, and in which:

The single figure is a fragmentary view, partially in perspective and partially in transverse section, illustrating the invention as it is embodied in a threshhold strip for a door of a building.

In accordance with this invention, the improved sealing means is illustrated as a threshhold strip for the door of a building. The strip is made as a one-piece unitary extrusion of materials that have different compositions in different parts thereof, each appropriate to the function performed by the part. Thus, the strip is made or formed integrally of materials having at least two different stiffnesses for samples thereof of like dimensions so that the portion of the gasket which is required to be flexible for ready deformation can have that function while the attaching portion may have sufficient rgidity that separate attaching strips or clips are not necessary for properly mounting the sealing member in place.

In the illustrated embodiment, the strip 10 is a unitary extrusion of stiff and flexible materials integrally united together. Thus, the extrusion comprises an elongated base portion 11 of stiff plastic shaped to conform with the sill on which it is mounted. One face of the strip 11 is provided with integral attaching means comprising two laterally spaced, longitudinally extending strips 12 and 13. These attaching strips, like the base portion 11, are formed of the stiff plastic material and, in the illustrated embodiment, have a configuration which is J-shape in cross section. The face of the base portion 11, opposite the flanges 12 and 13, is provided with a hollow body 14 bounded on its outer surface by a deformable arcuate wall 15 that is convexo-concave in cross section and is formed of material more flexible than that of the base and attaching portions. The wall 15 is integrally united at its edges to the base portion 11 and the outer surface of the wall 15 is preferably provided with a plurality of longitudinally extending outwardly projecting flexible ribs 16 for engagement with the door member beneath which the threshhold strip is mounted.

Preferably, the materials of different stiffness employed in the threshhold strip are formed from the same synthetic resin but contain differing amounts of plasticizer. By way of example, the material may be polyvinyl chloride with the base 11 and attaching portions 12 and 13 formed of such material without plasticizer or with less plasticizer than the deformable arcuate wall 15 and ribs 16 which contain plasticizer in sufficient quantity to impart the requisite flexibility.

One convenient manner of determining the proper degree of respective flexibility and stiffness for the deformable and attaching portions of the sealing member is by measuring the hardness of the extruded materials since flexibility is directly related to the hardness as measured by a durometer. Thus, it has been found that the required differences in flexibility for satisfactory operation of the several parts of the sealing member, in accordance with this invention, is achieved when the stiffer portion has a hardness within the range measurable by a type D Shore durometer whereas the part of the sealing member having the greater flexibility should have a hardness within the range measurable by a type A Shore durometer. More specifically, the stiffer portion of the extrusion preferably has a hardness reading of up to 80 on a type D Shore durometer and the material comprising the flexible portion of the gasket preferably has a reading of not less than 60, and preferably 70, on a type A Shore durometer. The values of 60 on the Shore scale A and 80 on the Shore scale D therefore represent the limits for the flexible and stiff portions. It is possible to employ a wide range of combinations of relative stiffness between those limits.

The extrusion comprising the improved sealing member can be made by known dual extruding equipment of the type employing two separate extrusion chambers feeding a common extrusion die with one of the extruders provided with the stiffer material and the other extruder provided with the more flexible material. By way of example but without limitation thereto, the portions of the die corresponding to the cross section of the sealing member having the greater flexibility can be fed by an extruder containing plasticized polyvinyl chloride while unplasticized polyvinyl chloride is fed by a separate extruder to a side opening in the die communicating with the portions of the passageway therein which define the part of the cross section of the sealing member that is stiffer. Hence, both the stiffer and more flexible materials issue from the die as a single integral strip which may be cut to desired length. The strip may be installed without the need of separate fasteners by snapping the walls 12 and 13 into appropriate grooves or channels.

The invention has been described primarily with reference to the use of plasticized and unplasticized polyvinyl chloride as the material for forming both the flexible and stiffer portions of the sealing members. It will be apparent, however, that the invention is not restricted to complete absence of plasticizer in the stiffer portions. Moreover, materials other than polyvinyl chloride may be employed. The materials should, however, be compatible so that when extruded together they remain united and do not separate nor have an inherent weakness at the regions of union. It is to be further understood that when reference has been made heretofore in the description, and hereinafter in the claims, to materials of different stiffness, the expression is intended to refer to materials which exhibit such difference when specimens of like dimension are compared as distinguished from the difference in stiffness which is exhibited by members due solely to their differences in cross-sectional configuration rather than their composition.

The embodiment of the invention which has been specifically illustrated and described is not inclusive of all forms in which the invention may be employed. Thus, it will be readily apparent that the principles of this invention may be utilized for threshold and similar sealing strips in which the shape of the attaching portion and/or the shape of the hollow body are different from the configuration illustrated and described. Moreover, the base portion 11 may be formed of the same flexible material as utilized for the wall 15 and ribs 16 with only the attaching portions 12 and 13 formed of the stiffer material. Hence, it is to be understood that the invention is susceptible of adaptations and variations within the spirit and scope of the appended claims.

Having thus described the invention, we claim:

1. A one-piece elongated extrusion of synthetic plastic adapted to provide a seal between a wall member having an opening and a closure member for that opening, the said extrusion comprising an elongated strip-like base portion, attaching means comprising a pair of laterally spaced longitudinally extending strips projecting from one side of said base portion intermediate the edges of the latter to secure the gasket to one of said members by insertion of said attaching means into spaced recesses in said one of the members, and a deformable sealing portion integral with said base portion, the said sealing portion comprising a generally arcuate wall the longitudinal edges of which are spaced from one another and are each integrally united to the said strip-like base portion on the opposite side thereof from said attaching means and at locations laterally spaced from the edges of said base portion with the arcuate wall intermediate its edges spaced from the said strip-like base portion to form therewith an elongated hollow chamber which is adapted to be deformed by engagement with the other of said members, the said attaching means and arcuate wall being formed respectively of plastic materials exhibiting different stiffness for samples of like dimensions with the said attaching means being formed of stiffer material than that comprising the said arcuate wall.

2. A one-piece elongated extrusion as defined in claim 1 wherein the said base portion and attaching means are both formed of substantially rigid plastic with the attaching means in the form of two spaced strips generally J-shape in cross section extending generally perpendicularly from the said base portion and the said arcuate wall is formed of flexible plastic in a configuration generally convexo-concave in cross section.

3. A one-piece elongated extrusion as defined in claim 1 wherein the outer surface of the arcuate wall is provided with at least one deformable sealing rib extending longitudinally of the wall.

4. A one-piece elongated extrusion as defined in claim 1 formed entirely of synthetic plastic capable of having its stiffness reduced by the addition thereto of a plasticizer, there being a greater proportion of plasticizer in the portion of the extrusion having the lesser stiffness than in the portion having the greater stiffness.

5. A one-piece elongated extrusion as defined in claim 1 wherein the portions of lesser stiffness have a durometer reading of not less than 60 on the Shore A scale while the portion of rgeater stiffness has a durometer reading not over 80 on the Shore D scale.

References Cited

UNITED STATES PATENTS

| | | | |
|---|---|---|---|
| 2,140,844 | 12/1938 | Mirus-Leuschner | 49—490 |
| 2,180,886 | 11/1939 | Thomas | 49—489 |
| 2,766,494 | 10/1956 | Stremmel | 49—490 X |
| 2,849,763 | 9/1958 | Leigh | 49—490 X |
| 3,004,308 | 10/1961 | Young | 49—469 |
| 3,110,065 | 11/1963 | Dennis | 49—498 X |
| 3,148,419 | 9/1964 | Straus et al. | 49—469 |
| 3,167,825 | 2/1965 | Zoller | 49—490 |
| 3,177,534 | 4/1965 | Millhouse et al. | 49—490 X |
| 3,227,423 | 1/1966 | DeMatteo | 256—12.5 |

DAVID J. WILLIAMOWSKY, *Primary Examiner.*

P. C. KANNAN, *Assistant Examiner.*